US006969184B2

(12) United States Patent
Bergman et al.

(10) Patent No.: US 6,969,184 B2
(45) Date of Patent: Nov. 29, 2005

(54) ADJUSTABLE HEADLIGHT

(75) Inventors: Ron Bergman, McIntosh, MN (US); John Zins, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/262,756

(22) Filed: Oct. 1, 2002

(65) Prior Publication Data

US 2004/0062053 A1    Apr. 1, 2004

(51) Int. Cl.[7] .......................... F21V 19/02; F21V 21/14
(52) U.S. Cl. ...................... 362/530; 362/496; 362/544; 362/418
(58) Field of Search ............................... 362/529, 523, 362/525, 531, 532, 530, 538, 544, 546, 549, 362/233, 238, 239, 240, 250, 372, 418, 496

(56) References Cited

U.S. PATENT DOCUMENTS

| 3,743,316 | A | * | 7/1973 | Stotesbery | 280/762 |
| 4,141,063 | A | * | 2/1979 | Kumagai et al. | 362/425 |
| RE32,088 | E | * | 2/1986 | Sip | 362/549 |
| 4,821,155 | A | * | 4/1989 | Harting | 362/527 |
| 5,639,155 | A | * | 6/1997 | Kowall et al. | 362/529 |
| 5,647,659 | A | * | 7/1997 | Mori | 362/524 |
| 2003/0039124 | A1 | * | 2/2003 | Tawa et al. | 362/464 |

FOREIGN PATENT DOCUMENTS

GB        2239512 A   * 12/1990   ............ B60Q 1/04

* cited by examiner

*Primary Examiner*—Alan Cariaso
*Assistant Examiner*—Sharon Payne
(74) *Attorney, Agent, or Firm*—Black Lowe & Graham; Darren J. Jones

(57) ABSTRACT

The present invention relates to a vehicle headlight assembly having a lamp housing that is pivotally mounted to the vehicle body. One embodiment of the invention includes a lamp housing that is pivotally mounted to the vehicle body and includes a threaded aperture for receiving a threaded adjustment mechanism that is inserted through an aperture in the vehicle body and into the housing aperture. Rotation of the adjustment mechanism adjusts a position of the lamp housing relative to the vehicle body. Typically, a head portion of the adjustment mechanism is positioned on an exterior of the vehicle and is accessible by an operator of the vehicle from a normal operating position of the vehicle for adjusting the position of the housing relative to the vehicle body.

14 Claims, 3 Drawing Sheets

ADJUSTABLE HEADLIGHT

BACKGROUND OF THE INVENTION

1. Field of Invention

The invention relates generally to headlights and relates more specifically to headlights for a vehicle. More particularly, the invention relates to headlights for a motorized track-driven vehicle such as a snowmobile or ATV.

2. Related Art

Headlights have been used for motorized vehicles since nearly the inception of motorized vehicles in the early 1900's. One design objective for vehicle headlights has been to mount the headlights to the vehicle so that they are adjustable. Headlights may be adjusted both vertically and laterally. Typically, vertical adjustments are enabled by pivotally mounting the headlights to the vehicle and are made to vary the distance in front of the vehicle that is illuminated by the headlights. Another way of making a vertical adjustment is to raise or lower the headlights relative to the vehicle. Lateral adjustments change the direction of illumination in the lateral direction. Often, headlights are fixed in the lateral direction and may be adjusted only in the vertical direction.

A common disadvantage to known headlight mounting configurations is the time and complexity involved in adjusting the headlight. For example, access to a rear portion of a headlight, the location for headlight adjustment mechanisms for many headlights, may be located under a hood or enclosed in a headlight compartment of the vehicle and is therefore difficult to access. Another common disadvantage with known headlights is their inability to maintain a particular adjusted position, especially during prolonged, high stress use.

SUMMARY OF THE INVENTION

The present invention generally relates to a snowmobile or ATV ("vehicle") headlight assembly having a lamp housing that is pivotally mounted to the vehicle body. One embodiment of the invention includes a lamp housing that is pivotally mounted to the vehicle body and includes a threaded aperture for receiving a threaded adjustment mechanism. The adjustment mechanism is inserted through an aperture in the vehicle and engages the housing threaded aperture. Rotation of the adjustment mechanism adjusts a position of the lamp housing relative to the vehicle body. The lamp housing typically is mounted on an interior of the vehicle body, and a head portion of the adjustment mechanism is positioned on an exterior of the vehicle body and is easily accessible by an operator of the vehicle for adjusting the position of the lamp housing.

The above summary of the present invention is not intended to describe each disclosed embodiment or every implementation of the present invention. The figures and the detailed description that follows more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

Figure 1:
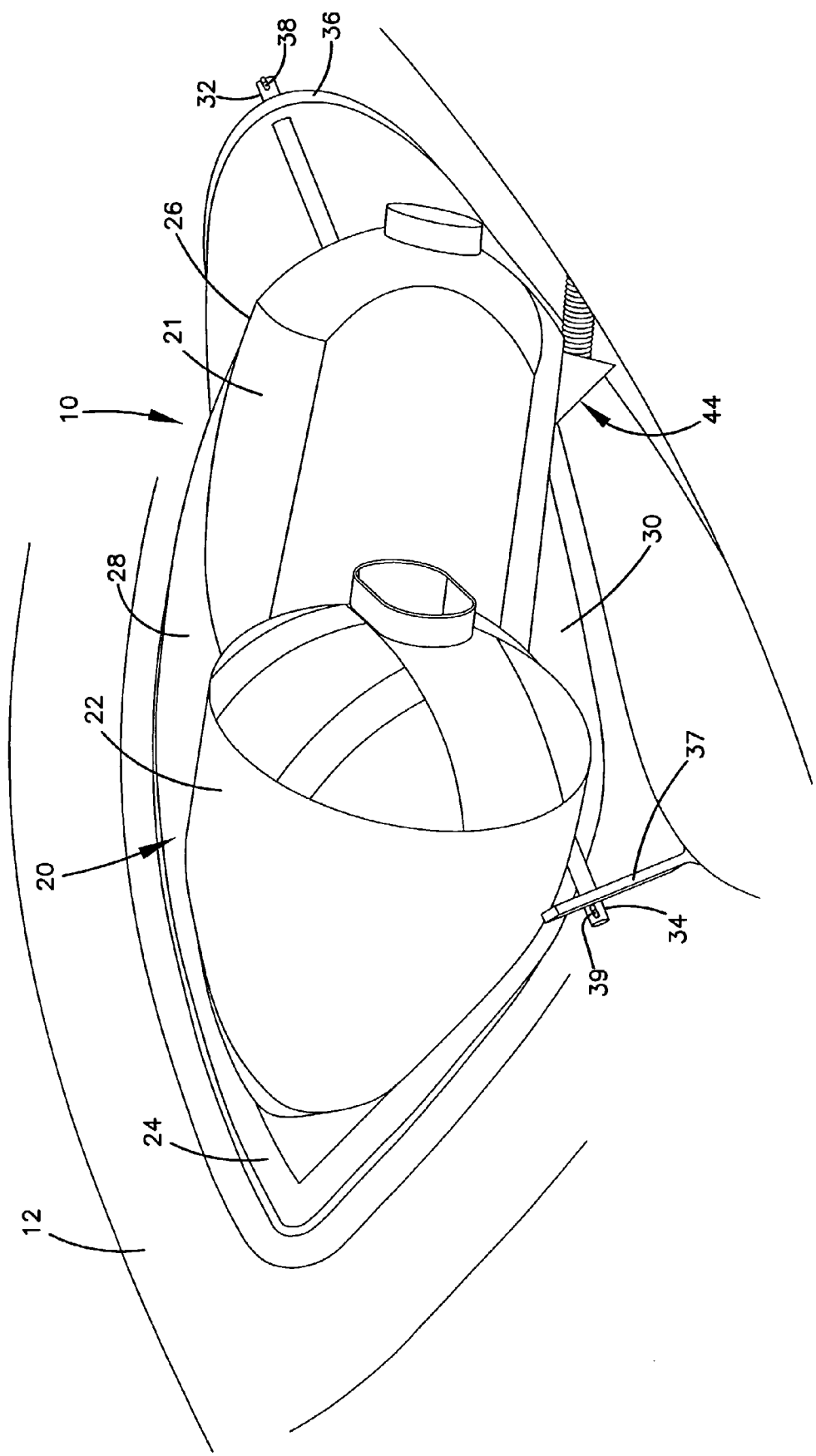
FIG. 1 is a bottom perspective view of a headlight assembly mounted to a vehicle body, according to the invention.

While the invention is amenable to various modifications in alternative forms, the specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to headlight assemblies, for example, headlight assemblies for a motorized vehicle. In particular, the present invention is directed to a headlight assembly for a snowmobile or ATV, that is pivotally mounted to the vehicle body and adjustable relative to the vehicle body.

One example of a headlight assembly 10 of the present invention is shown secured to a vehicle body front portion 12 in FIG. 1. Body front portion 12 is typically positioned at the front end of a vehicle and may even define a front end of the vehicle. An operator or driver of a vehicle having a body front portion 12 typically sits in a driver position 16 (see FIG. 3) that is rearward on or in the vehicle relative to the body front portion 12. It would be advantageous in many instances for the operator or driver to be able to adjust the vehicle headlights, mounted at the vehicle body front portion 12, from the driver's seated position 16.

Figure 3:
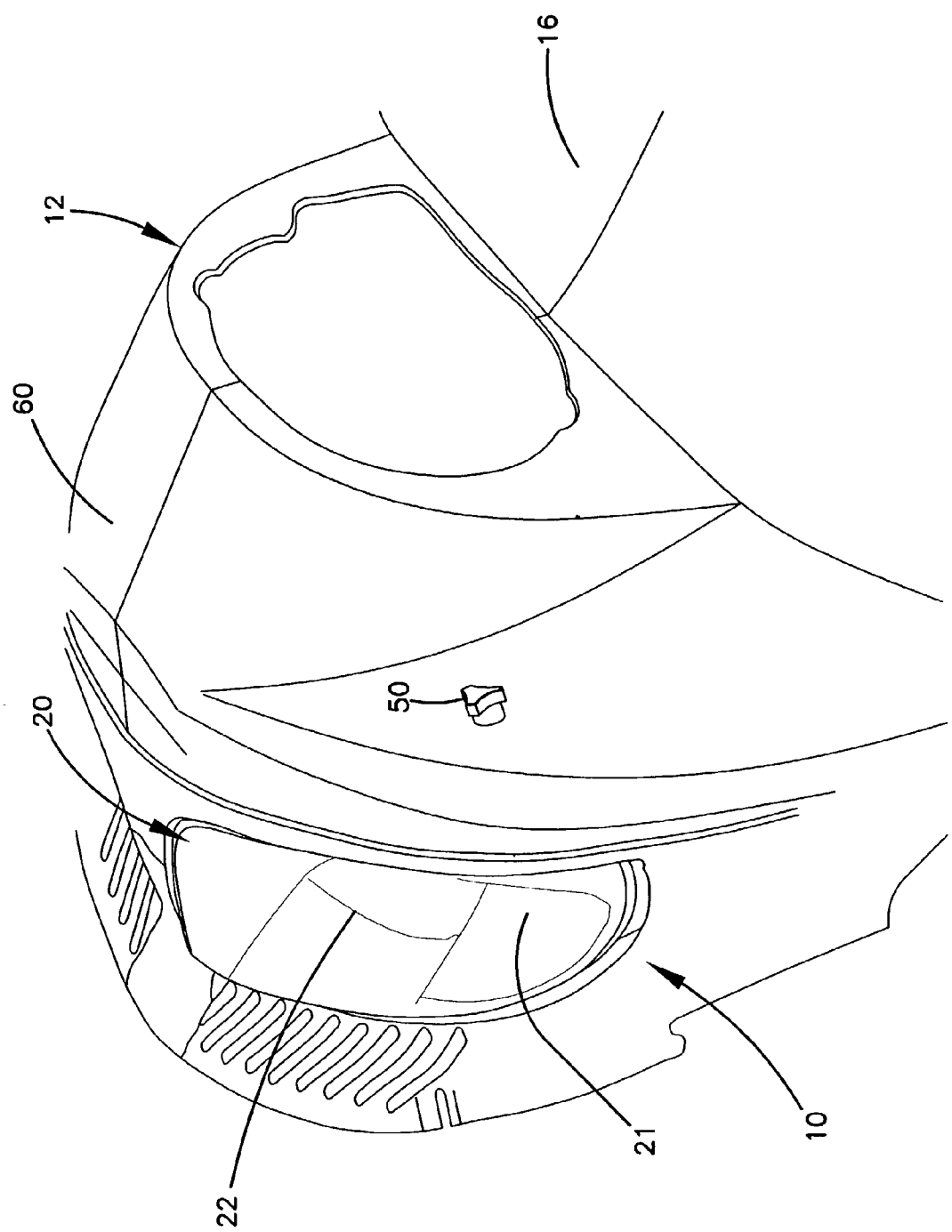
FIG. 3 is a top perspective view of the headlight assembly of FIG. 1.

Vehicle body front portion 12 includes a bottom side (see FIG. 1) and a top side (see FIG. 3). Headlight assembly 10 includes a lamp housing 20 to which at least one lamp, such as lamps 21 and 22, is mounted. Lamps 21 and 22 are typically oriented so that they face forward relative to the vehicle. Lamp housing 20 includes a first end 24, a second end 26 (not fully shown), a first side 28, and a second side 30. In the embodiment illustrated in FIG. 1, housing 20 is generally elliptical-shaped with relatively long sides 28 and 30 and pointed ends 24 and 26. In alternative embodiments, housing 20 may have many alternative shapes and may be configured to correspond to the shapes and contours of the vehicle body to which it is attached.

Lamp housing 20 also includes a first pivot member 32 secured to housing second end 26, and a second pivot member 34 secured to housing second side 30 at a location on the housing that is spaced apart from pivot member 32. Pivot members 32 and 34 are mounted to mounting brackets 36 and 37 that are secured to the vehicle body front portion 12. The pivot members may be secured to the mounting brackets with attachment members 38 and 39 that may be spring clips, lock nuts, or the like that prevent the pivot member from sliding out of or otherwise being removed from the mounting bracket. In other embodiments, the mounting brackets may be configured to lock the pivot members in the bracket while allowing pivoting motion of the pivot members relative to the bracket.

The shape of pivot members 32 and 34 facilitate a pivoting motion of housing 20 about the mounting brackets. Pivot members 32 and 34 may be end portions of a single rod or shaft that extends along second housing side 30 between mounting brackets 36 and 37. In other embodiments, pivot members 32 and 34 are separate members that are coaxially aligned or aligned parallel to each other on separate axis. In yet further embodiments, pivot members 32 and 34 are not aligned coaxially or in parallel, but are mounted to mounting brackets 36 and 37 in a way that permits pivoting of housing 20 about the mounting brackets.

Figure 2:
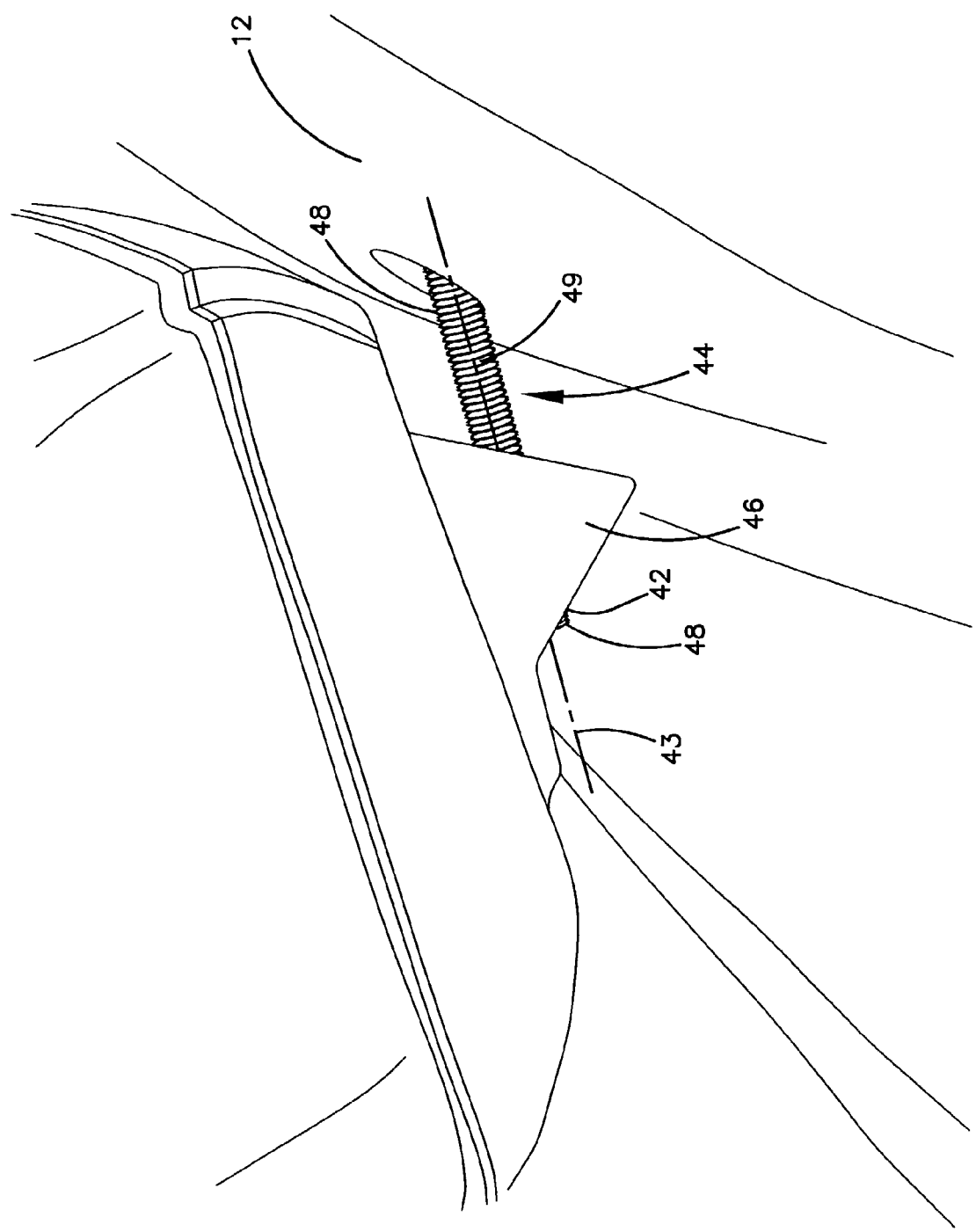
FIG. 2 is a partial perspective view of a threaded aperture in a headlight housing and a threaded adjustment mechanism of the headlight assembly of FIG. 1.

Headlight assembly 10 includes an adjustment mechanism 44 that controls the position of housing 20 relative to the body front portion 12. FIG. 2 is a partial perspective view of the adjustment mechanism 44, including an adjustment protrusion 46 secured to housing 20, a threaded aperture 42 (not shown) formed in adjustment protrusion 46, and a threaded shaft 48 engaging aperture 42 and passing through body front portion 12. Adjustment mechanism 44 may also include a spring or biasing member 49 that is positioned between housing 20 and vehicle front body portion 12 to bias the housing into a given pivoted position. In one embodiment, the spring is a compression spring that is adjacent to or wrapped around the threaded shaft. In another embodiment, the spring is a tension spring that exerts a force on the housing in an opposite direction from the direction in which threaded shaft 48 extends from the housing 20 to the head portion 50.

Adjustment mechanism 44 may be positioned along second side 30 of housing 20 (as illustrated in FIG. 1), along first side 28, at first end 24, or at other positions on the housing that would facilitate pivoting of housing 20 about the mounting brackets.

Adjustment mechanism 44 also includes a head portion 50 (see FIG. 3) secured to an end of threaded shaft 48 so that it is positioned on the top side of the vehicle body front portion 12 and is accessible by a person seated in driver position 16.

To enable the pivotal adjustment of housing 20 about pivot members 32 and 34, an axis 43 of threaded aperture 42 and shaft 48 must not be aligned parallel with the axis of pivot members 32 and 34. As a result of this nonparallel arrangement, housing 20 is able to rotate about pivot members 32 and 34 as shaft 48 is rotated into and out of threaded aperture 42.

In other embodiments of adjustment mechanism 44, the mechanism includes a shaped bushing or nut that is secured to the housing so that it does not rotate and is positioned to receive the threaded shaft. In other embodiments, adjustment mechanism 44 includes a clip nut, a snap ring, or the like to hold the housing in a given pivoted position.

FIG. 3 illustrates the top side 60 of vehicle body front portion 12 with a portion of housing 20 visible through the vehicle body. Lamps 21 and 22 are aligned in a forward facing direction relative to the vehicle body. Adjustment mechanism head portion 50 is exposed on top surface 60 and may be positioned on the dash board or control panel of the vehicle, allowing adjustments to be made by an operator of the vehicle from driver position 16. Rotation of head portion 50 rotates threaded shaft 48 within threaded aperture 42 to adjust a position of lamp housing 20 relative to the vehicle body. More specifically, rotating head portion 50 (thereby rotating threaded shaft 48) causes adjustment protrusion 46 to translate along the threaded shaft, thereby pivoting the lamp housing about the pivot members 32 and 34.

In another embodiment of the present invention, adjustment mechanism 44 may be configured differently, yet obtain the same objective. For example, threaded shaft 48 may be integrally formed from or fixed to housing 20, and an adjustable nut is attached to an opposite end of threaded shaft 48 on the top side 60 so that it is accessible from driver position 16. Rotation of the nut on threaded shaft 48 would cause motion of housing 20 about pivot members 32 and 34 while allowing an operator of the vehicle to control the amount of adjustment being made along threaded shaft 48.

In another embodiment of the present invention, pivot members 32 and 34 may be positioned at different locations on housing 20 than those positions illustrated in FIG. 1. For example, pivot member 32 or pivot member 34 may be positioned at housing first end 24. In such a configuration, the other pivot member would be realigned so that pivoting of housing 20 is permitted about pivot members 32 and 34.

In another embodiment, pivot members 32 and 34 may be fixed to vehicle body front portion 12 and engage apertures or mounting brackets positioned on lamp housing 20. This arrangement would be essentially a reversal of the positions of pivot members 32 and 34 and mounting brackets 36 and 37 shown in FIG. 1.

In another embodiment, pivot members 32 and 34 are oriented vertically above and below lamps 21 and 22 and the adjustment mechanism pivots housing 20 laterally rather than vertically. As with the headlight assembly of FIGS. 1–3, this alternative embodiment may include an adjustment mechanism with an adjustment head that is accessible by an operator of the vehicle from an exterior of the vehicle, preferably from driver position 16. These examples illustrate that there are multiple arrangements of the pivot members for obtaining the same or similar adjustments to the headlight housing position relative to the vehicle body.

In a further alternative embodiment, the assembly of FIGS. 1–3 could be combined with other headlight adjustment features to provide for a headlight that is adjustable in both the horizontal and vertical directions while maintaining the advantage of the present invention.

In the embodiment of FIGS. 1–3, housing 20, including pivot members 32 and 34, may be made of plastic that is metalized. However, in alternative embodiments, any or all of the components of headlight assembly 10 may be made of other materials or a combination of materials such as ceramics, polymer-based materials, glass and metal alloys. For example, attachment protrusion 46 into which threaded aperture 42 is formed, may be made of plastic or a similar material that holds attachment mechanism 44 in place in the threaded aperture with an interference fit so that attachment mechanism 44 does not inadvertently rotate within aperture 42.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A headlight assembly for a snowmobile or an ATV, comprising:
    a lamp housing pivotally mounted to a vehicle body with first and second pivot members, the lamp housing comprising a threaded aperture;
    a threaded adjustment member at least partially exposed through an aperture of the vehicle body and engaging the housing aperture, a portion of the adjustment member being accessible from an exterior of the vehicle;
    wherein the first and second pivot members extend in a first plane, and the housing aperture extends in a second plane, noncoplanar relative to the first plane.

2. The assembly of claim 1 wherein the lamp housing comprises first and second ends and first and second sides, the first pivot member being secured to the first end, and the second pivot member being secured to the second side, wherein the housing pivots about the first and second pivot members.

3. The assembly of claim 2 wherein the vehicle body includes mounting brackets, and the first and second pivot members comprise pivot axles secured to the lamp housing that engage the mounting brackets.

4. The assembly of claim 2 wherein the threaded aperture is formed in the housing between the first and second pivot members.

5. The assembly of claim 4 wherein the threaded aperture is formed in an adjustment protrusion extending from the housing second side.

6. The assembly of claim 1, whereby rotation of the threaded adjustment member adjusts a position of the housing relative to the vehicle body.

7. The assembly of claim 1 wherein the threaded adjustment member comprises a threaded shaft and head portion at an end of the threaded shaft, and rotating the head portion moves the threaded shaft relative to the housing threaded aperture.

8. The assembly of claim 7 wherein the lamp housing is located at a front end of the vehicle and the adjustment member head portion is accessible by an operator of the vehicle from an operating position of the vehicle.

9. The assembly of claim 2 wherein rotation of the threaded adjustment member rotates the housing about the first and second pivot members to adjust the height of a beam of light emitted from the headlight assembly.

10. A snowmobile, comprising:
a body;
a hood; and
the headlight assembly of claim 1;
wherein the lamp housing is pivotally mounted to the body, the hood is secured to the body to cover a portion of the lamp housing, and the adjustment member is accessible from a normal operating position of the snowmobile.

11. The snowmobile of claim 10 further comprising an operator control panel, and the threaded member extends through the body at the control panel.

12. The assembly of claim 1, wherein the lamp housing is pivotally mounted to a hood portion of the vehicle body.

13. A headlight assembly for a snowmobile or an ATV, comprising:
a lamp housing pivotally mounted to a vehicle body and comprising a threaded aperture; and
a threaded adjustment member at least partially exposed through an aperture of the vehicle body and engaging the housing aperture, a portion of the adjustment member being accessible from an exterior of the vehicle;
wherein the lamp housing is pivotally mounted to a hood portion of the vehicle body.

14. The headlight assembly of claim 13, wherein rotation of the threaded adjustment member adjusts a position of the housing relative to the vehicle body.

* * * * *